United States Patent
Shukla et al.

(10) Patent No.: US 9,448,903 B2
(45) Date of Patent: Sep. 20, 2016

(54) MULTIPLE TEST TYPE ANALYSIS FOR A TEST CASE USING TEST CASE METADATA

(71) Applicant: VMWARE, INC., Palo Alto, CA (US)

(72) Inventors: Anoop Shukla, Bangalore (IN); Vineet Kumar Sinha, Bangalore (IN); Prasenjit Sarkar, Bangalore (IN); Prashant Kumar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/499,276

(22) Filed: Sep. 29, 2014

(65) Prior Publication Data

US 2016/0048437 A1    Feb. 18, 2016

(30) Foreign Application Priority Data

Aug. 16, 2014  (IN) .......................... 4007/CHE/2014

(51) Int. Cl.
*G06F 9/44* (2006.01)
*G06F 11/263* (2006.01)

(52) U.S. Cl.
CPC .................................. *G06F 11/263* (2013.01)

(58) Field of Classification Search
CPC ........... G06F 11/3624; G06F 11/3672; G06F 11/3684; G06F 9/52
See application file for complete search history.

(56) References Cited

U.S. PATENT DOCUMENTS

| | | | |
|---|---|---|---|
| 2006/0101397 A1* | 5/2006 | Mercer ............... | G06F 11/3684 717/120 |
| 2012/0291013 A1* | 11/2012 | Fisher ...................... | G06F 9/52 717/124 |
| 2014/0123110 A1* | 5/2014 | Wan .................... | G06F 11/3672 717/124 |
| 2014/0359579 A1* | 12/2014 | Cavanaugh ......... | G06F 11/3624 717/124 |

* cited by examiner

*Primary Examiner* — Li B Zhen
*Assistant Examiner* — Lenin Paulino

(57) ABSTRACT

In one embodiment, a method determines a test case containing test code for testing a functionality of a computer system. The test case is associated with metadata. The metadata is parsed to determine a plurality of system test types and one or more parameters for the plurality of system test types wherein the one or more parameters indicate system conditions for the computer system. The method executes a set of tests using the test code with the computer system using the system conditions. Results of the executed set of tests are output for the plurality of system test types.

15 Claims, 6 Drawing Sheets

```
Test case
  104
       ─202
    @Performance(
204 {"class":"Abc",
      "methods":[{"name":"createAbc","benchMark":"1000ms"}, {"name":"listAbc","benchMark":"1000ms"}],
      "Stress":{"userData", type = "parallel", {"StressLimit":"1","StressLimit":"10","StressLimit":"50"})
208─1 "load":{"No. users in system":"1","No. users in system":"100"})
              208─2
    testCreateUser()  ─211─1
    {
      //Test code   ─112
    }
    testlistUser()  ─211─2
    {
      //Test code   ─112
    }
```

FIG. 2

```
Test case
104
       502-1
    @Load
    (LoadLimit="1",LoadLimit="10",LoadLimit="50",
        LoadLimit="100,data="dataMethod")
    testCode()                     506
    {
           //Test Code
    }                      112
       @Data
   502-2 dataMethod()
    {
           //Test code
    }
```

MULTIPLE TEST TYPE ANALYSIS FOR A TEST CASE USING TEST CASE METADATA

RELATED APPLICATION

Benefit is claimed under 35 U.S.C. 119(a)-(d) to Foreign application Serial No. 4007/CHE/2014 filed in India entitled "MULTIPLE TEST TYPE ANALYSIS FOR A TEST CASE USING TEST CASE METADATA", filed on Aug. 16, 2014, by VMware, Inc., which is herein incorporated in its entirety by reference for all purposes.

BACKGROUND

A system, such as a software program, computer system, or combination thereof, needs to be tested to ensure the system is operating adequately. A test automation developer may test the system using different system test types, such as functional, performance, and load test types. For each test type, the test automation developer writes a different test case. For example, the test automation developer writes a first test case for a functional test, a second test case for a performance test, a third test for a load test, and so on. Also, not only may the test automation developer want to perform a load test, the test automation developer might want to test the computer system with different loads. Each different load for the load test also requires a different test case.

In some cases, the test code for the test cases may include redundant code. However, the test automation developer includes the redundant test code in each test case. This makes the test code for all the test cases very large with many redundancies. Also, the above approach makes the test automation developer write or incorporate the same test code again and again in different test cases. When any changes need to be made to the redundant code, because the redundant code is included in multiple test cases, the test automation developer needs to edit the test code in multiple places. This may be an inefficient task especially when the redundant code is included in many test cases. Also, because each test case is written separately, each test case is executed separately. This may consume a lot of time and might not yield accurate results due to the tests being executed at different times.

SUMMARY

In one embodiment, a method determines a test case containing test code for testing a functionality of a computer system. The test case is associated with metadata. The metadata is parsed to determine a plurality of system test types and one or more parameters for the plurality of system test types wherein the one or more parameters indicate system conditions for the computer system. The method executes a set of tests using the test code with the computer system using the system conditions. Results of the executed set of tests are output for the plurality of system test types.

The following detailed description and accompanying drawings provide a better understanding of the nature and advantages of particular embodiments.

BRIEF DESCRIPTION OF THE DRAWINGS

FIG. 2 shows an example of software code for a test case according to one embodiment.

FIG. 5 depicts another example for a test case according to one embodiment.

DETAILED DESCRIPTION

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments allow a user to write a single test case that can test multiple types of system tests on a computer system. For example, a test server may perform a functional test that also tests the stress, load, and/or performance of the computer system in combination at the same time. Particular embodiments add metadata to a test case that specifies which system test types to run for the test case and parameters for the system test types that specify system conditions. The test case also includes test code that is being tested. After reading the metadata, the test server may run multiple tests in conjunction if needed and output results for the system test types. In this case, the user does not include the test code in separate test cases to perform the multiple tests.

Figure 1:
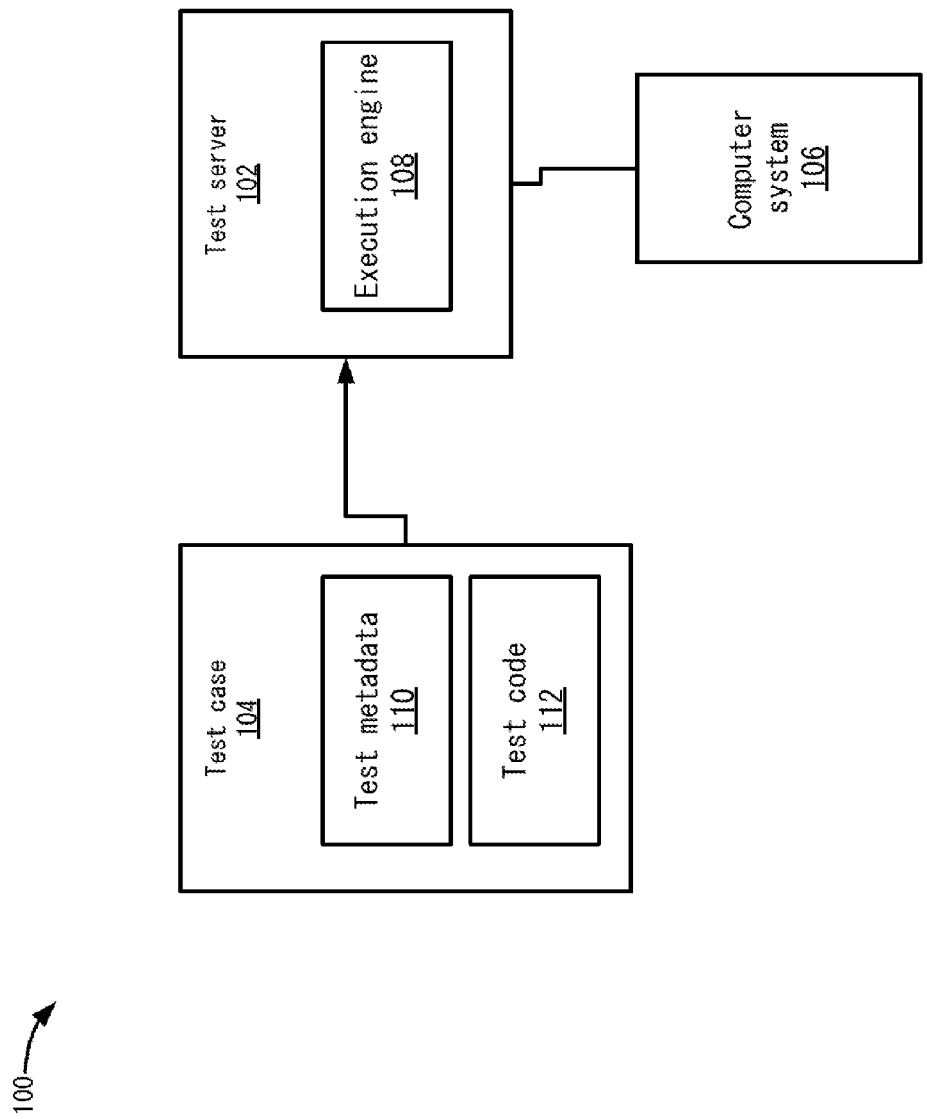
FIG. 1 depicts a simplified system for performing system tests according to one embodiment.

FIG. 1 depicts a simplified system 100 for performing system tests according to one embodiment. System 100 includes a test server 102 that receives a test case 104 for testing on a computer system 106. Server 102 includes an execution engine 108 that executes test case 104. Test case 104 may be testing software code on computer system 106. In one embodiment, computer system 106 may include a virtualized computer system that is being tested. Also, although server 102 is shown as being separate from computer system 106, server 102 may be integrated with computer system 106, and also non-virtualized systems may be used in the testing process.

Test case 104 includes test metadata 110 and test code 112. Test metadata 110 may be included with a single instance of test code 112. Test metadata 110 may specify different types of system tests that will be performed for test code 112. System tests test some aspect of a system, such as the execution of the test code on computer system 106. For example, server 102 may test the functionality, load, performance, or stress for executing test code 112 with computer system 106. In one example of specifying different types of tests, test metadata 110 may specify a first system test type to be performed, such as a functional system test. This may test whether the test code functions properly. Then, for the first system test type, test metadata 110 may specify other system test types to be performed along with the first system test type. For example, once it is determined test code 112 functions properly, the performance of test code 112 may be tested. Further, other system test types may include a stress test and a load test that can be performed in conjunction with the performance test. All of the system test types specified by metadata 110 may be performed using test code 112. For example, test code 112 may include a redundant portion of test code that is used by the performance test, stress test, and load test. Particular embodiments do not have to use multiple test cases 104 or include the redundant portions of test code in multiple test cases to have all of the system test types performed.

Execution engine 108 may perform the system tests with computer system 106. For example, execution engine 108 may execute test code 112 to perform multiple system tests on computer system 106. In one example, test code 112 may cause computer system 106 to create a user account on computer system 106. Execution engine 108 monitors the multiple system tests when creating the user account, analyzes the results, and reports the results. The results are for the multiple system test types specified in test metadata 110.

To illustrate how the multiple system test types are specified, the following will describe an example of a test case 104 in more detail. FIG. 2 shows an example of software code for test case 104 according to one embodiment. Test case 104 includes metadata 110 and test code 112 as described above. Metadata 110 may include annotations, which may be specifications in metadata 110 that denote different system test types. For example, at 202, an annotation "@Performance" indicates that this is a system test that tests the performance of test code 112 on computer system 106. The "@" symbol may be the annotation that execution engine 108 recognizes as denoting a type of system test. Also, the term "Performance" after the @symbol may denote the type of system test is a performance test. If "Load" was specified, then the type of system test would be a load test. Although an "@" system is used, other methods of annotating metadata 110 may also be appreciated.

For the @Performance annotation, the performance system test type may also include parameters that execution engine 108 uses to run the system test. The parameters may include classes that include methods shown at 204 that should be run. Each class may specify a performance system test to run with test code 112. The classes may include methods that specify the functions to run. In this example, the methods include the functions "createUser" and "listUser", which may create a user and create a list of users, respectfully. The code for the functions "createUser" and "listUser" is included in test code 112, and is shown as "testCreateUser at 211-1 and "testlistUser( )" at 211-2. The test code 112 for the function testCreateUser( ) is configured to create a user on computer system 106. Also, the test code for the function testlistUser( ) is configured to create a list of users on computer system 106.

Each method may also include system parameters. For example, the parameters may specify system conditions in which to run the system tests or parameters that are used in the generating of results of the system tests. For example, the parameters may include a stress condition, such as create 100 users in parallel, or a benchmark, such as create 100 users within 1000 ms. At 206-1, the method createUser includes parameters that specify a benchmark, "benchMark", for the createUser method of 1000 ms. This means that the function createUser should not take more time than 1000 milliseconds for any of its invocation. Further, at 206-2, the method listUser has a benchmark of 1000 ms, which means the function listUser should not take more than 1000 milliseconds for any of its invocation.

The metadata for the performance system test type may also include information for other system test types. For example, the other system test types may be of a different type (e.g., stress or load). For example, at 208-1 and 208-2, a stress system test type and a load system test type, respectively, are associated with the performance system test type. As with the performance system test type, the other system test types at 208-1 and 208-2 may also specify parameters at 210-1 and 210-2. For example, for the stress system test type, a data provider parameter of "userData" is specified. The data provider specifies where to retrieve data for the stress test. Also, a parameter "type" indicates the stress test should be a parallel type, which may mean that the number of requests (e.g., 1, 10, and 50) should be executed in parallel. That is, the "StressLimit" parameter specifies that the performance of the functions createUser and listUser should be checked for 1, 10, and 50 parallel requests when the performance test is run.

For the load system test type, the parameters "No. of users in system" specifies the load to impose on computer system 106 as the performance test is being performed. For example, a load of 1 user and a load of 100 users should be tested in computer system 106 when the functions createUser and listUser functions are run.

When execution engine 108 parses metadata 110, execution engine 108 recognizes the performance system test type at 202 due to the performance test annotation "@Performance". Also, execution engine 108 recognizes the stress system test type annotation and load system test type annotation within the performance test annotation. Execution engine 108 may then review the associated parameters for the annotations and executes tests to perform the specified system test types. Execution engine 108 uses test code 112 to perform the tests. For example, execution engine 108 may run the performance test for the functions createUser and listUser found in test code 112. In this example, execution engine 108 may first check whether the functionality of the functions createUser and listUser operate correctly. This check indicates whether the methods are functioning properly. If not, then execution engine 108 may not be able to check the performance of the method.

Assuming the functions operate correctly, in checking the performance of the methods, execution engine 108 uses the parameters specified with the performance system test type to analyze the results of the performance test. For example, execution engine 108 checks that the function createUser should not take more time than 1000 milliseconds for any of the invocations performed. Also, execution engine 108 checks that the function listUser should not take more time than 1000 milliseconds for any of its invocations. The parameters are specified in the metadata and not the test code, and thus can be changed easily. That is, if the parameters were included in the test code, finding and changing where all the parameters are located in the test code may be harder.

In checking the performance of the functions, due to the other system test types specified with the performance system test in metadata 110, execution engine 108 also incorporates other system test types while performing the performance test. For example, stress tests and load tests are incorporated with the performance test. Also, execution engine 108 recognizes the stress system test parameters that are specified in metadata 110, and then generates multiple tests for the different stress levels. For example, execution engine 108 runs the performance tests and checks for the performance of the functions createUser and listUser for 1, 10, 50, and 100 parallel requests. This tests how computer system 106 responds to the stress of the multiple parallel requests. Further, execution engine 108 recognizes the annotation of the load system test in metadata 110 and generates tests to test the load on computer system 106 while performing the performance test. For example, two tests to test the load of 1 user and 100 users are generated for the functions createUser and listUser separately.

In summary, execution engine 108 may execute multiple tests using test code 112 based on metadata 110. For example, for the function createUser, execution engine 108 may run the following tests:
1. Runs the function createUser once to test the functionality.
2. Runs the function createUser four times with the stress of 1, 10, 50, and 100 and records the performance data for each stress level.
3. Runs the function createUser twice with the load of 1 user and 100 users.

Thus, in all, execution engine 108 runs 7 tests. Also, for the 7 tests, execution engine 108 may record and analyze the results for the 7 tests and report them in the test results. For example, the different test types may be testing different aspects of the system. The stress test type is testing how the system can create a number of users in parallel. Also, the load test type is testing how the system performs with a number of users operating on the system. The results summarize how the system performed for the different test types.

Figure 3:
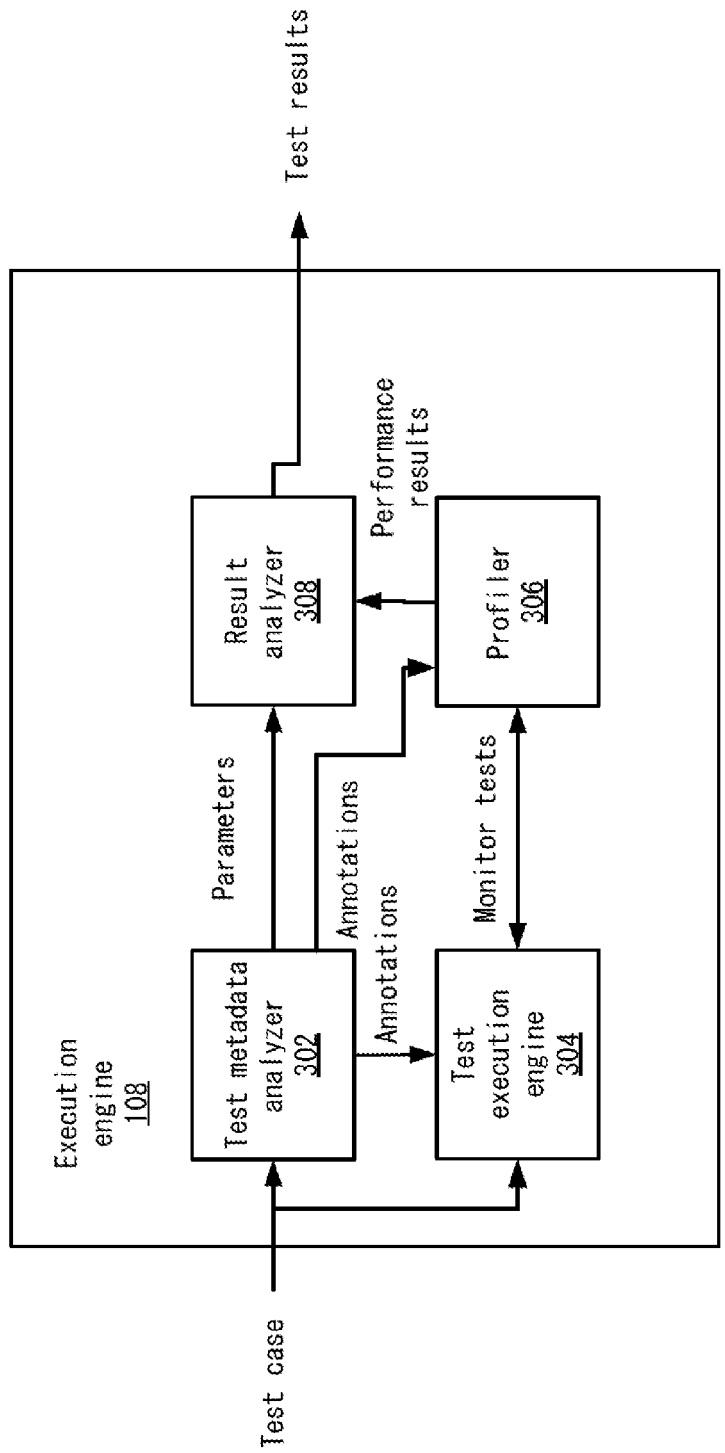
FIG. 3 depicts a more detailed example of an execution engine according to one embodiment.

Execution engine 108 may include different modules to execute tests for test case 104. FIG. 3 depicts a more detailed example of execution engine 108 according to one embodiment. When execution engine 108 receives test case 104, test metadata analyzer 302 may parse test case 104 for metadata 110. For example, test metadata analyzer 302 parses test case 104 looking for annotations in metadata 110. As discussed above, the annotations may be denoted by a symbol, such as a "@" symbol, and also an indication of which type of annotation it is, such as "Performance", "Load", or "Data". If any annotations are found, test metadata analyzer 302 notifies a test execution engine 304 of the annotations such that test execution engine 304 can configure different tests for test code 112.

Test execution engine 304 can create and run tests dynamically based on the metadata found in test case 104. For example, test execution engine 304 may run a test for test case 104 as a functional test plus any other test that was tagged in an annotation, such as a load test, stress test, etc. This may combine multiple types of tests to be performed with only a single instantiation of the same test code 112. That is, instead of just checking functionality for test code 112, test execution engine 304 may create multiple tests based on metadata 110, such as the seven tests described above.

A profiler 306 also receives the annotations and analyzes the methods for the annotated test types and determines which test results should be monitored. For example, for a performance test type, the time a function took to complete should be monitored. Profiler 306 records the applicable results, such as execution time for the performance test with various stress levels or loads. Then, profiler 306 sends the information to a results analyzer 308. For example, profiler 306 may determine the @Performance annotation includes methods for the functions createUser and listUser. Profiler 306 records monitors the performance of these functions, such as the execution time, for all of the tests that test execution engine 304 performs using the functions. The monitored performance is then sent to results analyzer 308.

Result analyzer 308 may then generate reports of the tests that test execution engine 304 performed. For example, result analyzer 308 generates a result for each test type performed in the methods in the @Performance annotation. Result analyzer 308 may parse metadata 110 to determine the methods specified and the specific parameters to determine if performance has improved or degraded (or passed/failed). In the example described in FIG. 2, profiler 306 may determine for the @Performance annotation that the benchmarks for the createUser function is 1000 ms and the benchmark for the listUser function is 1000 ms. Further, for the stress test annotation, result analyzer 308 determines the stress limits are 1, 10, 50, and 100. Lastly, result analyzer 308 determines from the load annotation that the load was tested with a number of users of 1 and 100. Result analyzer 308 then compares the monitored performance information from profiler 306 to the parameters to determine whether performance has improved or degraded/passed or failed. In this case, result analyzer 308 may report multiple test results for the system test types.

Figure 4:
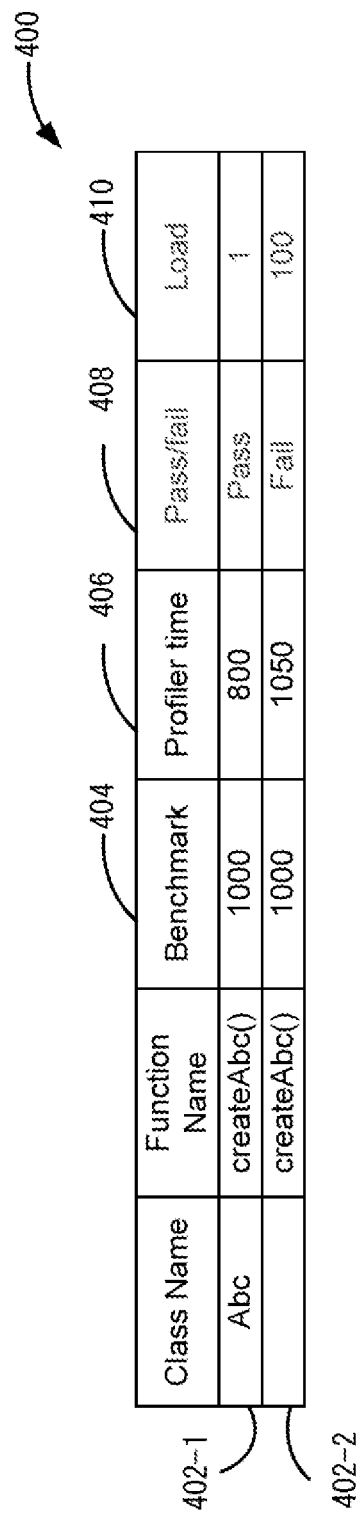
FIG. 4 shows an example of a test case result according to one embodiment.

FIG. 4 shows an example of a test case result according to one embodiment. The results may be for the execution of the createUser function with a load of 1 user and 100 users. Other results for test case 104 are not shown. Results analyzer 308 receives the performance information for the tests from profiler 306, such as the execution time. Results analyzer 308 may also determine the parameters for the createUser function from test metadata analyzer 302, such as the benchmark of 1000 ms for the function createUser. Then, results analyzer 308 may compare the benchmark for a particular test with the execution time for the test obtained from profiler 306. That is, results analyzer 308 determines the performance information when the function createUser was executed with a load of 1 user, and also with a load of 100 users. Results analyzer 308 then compares the performance information with the benchmarks, and can then determine whether the test passed or failed based upon the comparison.

The test results may be summarized in a table 400. Table 400 may provide the results for a performance and load combined test. Also, the test results may include a separate test result for a functional test, which determines whether test code 112 functioned correctly or not. In one embodiment, if the functional test fails, then the performance and load tests may also be shown as failing.

In table 400, rows 402-1 and 402-2 may summarize test results for different tests that are run using test code 112. In a first test in row 402-1, the function createAbc( ) in the class Abc is run with the benchmark of 1000 ms shown in a column 404. In this case, a user with a username of "Abc" is created by the function createUser. The time that profiler 306 determined it took to create the user Abc is shown in a column 406. In this case, the time to create the user Abe is "800 ms". Whether the test passed or failed is shown in a column 408, which in this case indicates that the test passed due to the creation time being less than the benchmark—800<1000. Also, in a column 410, the load that test execution engine 304 used in performing the test is shown, which is one user in this case. A row 402-2 shows a result for the same class Abc and function createUser, but with a different load of 100 users as shown in column 410. The same benchmark 1000 ms is used for this test. The profile time for this test is longer than the profile time for the test run with a load of 1 user, i.e., 1050>800. Due to the benchmark being 1000 ms, the time to create the user Abc is greater than the benchmark—1050>1000, and thus column 408 indicates the test fails.

Further, results analyzer 308 may determine that performance degraded when the load was increased from 1 user to 100 users because the time returned from profiler 306 increased from 800 ms to 1050 ms. Thus, rows 402-1 and 402-2 show the test results for a performance and load test that is performed in conjunction, and also the analysis when the conditions change.

Although the annotations are described above as being specified within one another, the annotations may be specified in test case 104 in different ways. FIG. 5 depicts another example for test case 104 according to one embodiment. In this case, the annotations may be provided separately instead of within another annotation. That is, in FIG. 2, the annotations for the data and load type of tests were specified within the performance annotation. However, when annotations are provided separately, metadata 110 may include a reference to associate the tests as will be discussed below.

At 502-1, the annotation for a load test "@Load" is shown along with test code 112 to test a function testCode( ). At 504, the load limits are specified as 1, 10, 50, and 100. This means that the load should be tested for 1, 10, 50, and 100 users when executing the function testCode. Further, the data that should be returned is specified at 506 as "dataMethod". This specifies the data provider to use when executing the function testCode.

Next, at 502-2, an annotation "@Data" is shown. The data annotation shows a function dataMethod( ) that corresponds to the function specified in the load annotation as a data provider. This associates the data system test type with the load test type and tests the function dataMethod when performing the load test type. In this case, the @Data annotation will return 1, 10, 50, and 100 object arrays in parallel for the above load test case. The returning of 100 object arrays allows test execution engine 304 to test the different loads of 1, 10, 50, and 100. Profiler 306 determines the performance for the loading of the object arrays, and also whether the loading of the object arrays worked functionally. This is all performed using single test code 112. Results analyzer 308 then analyzes the results to determine the performance for the different loads on the system.

Figure 6:
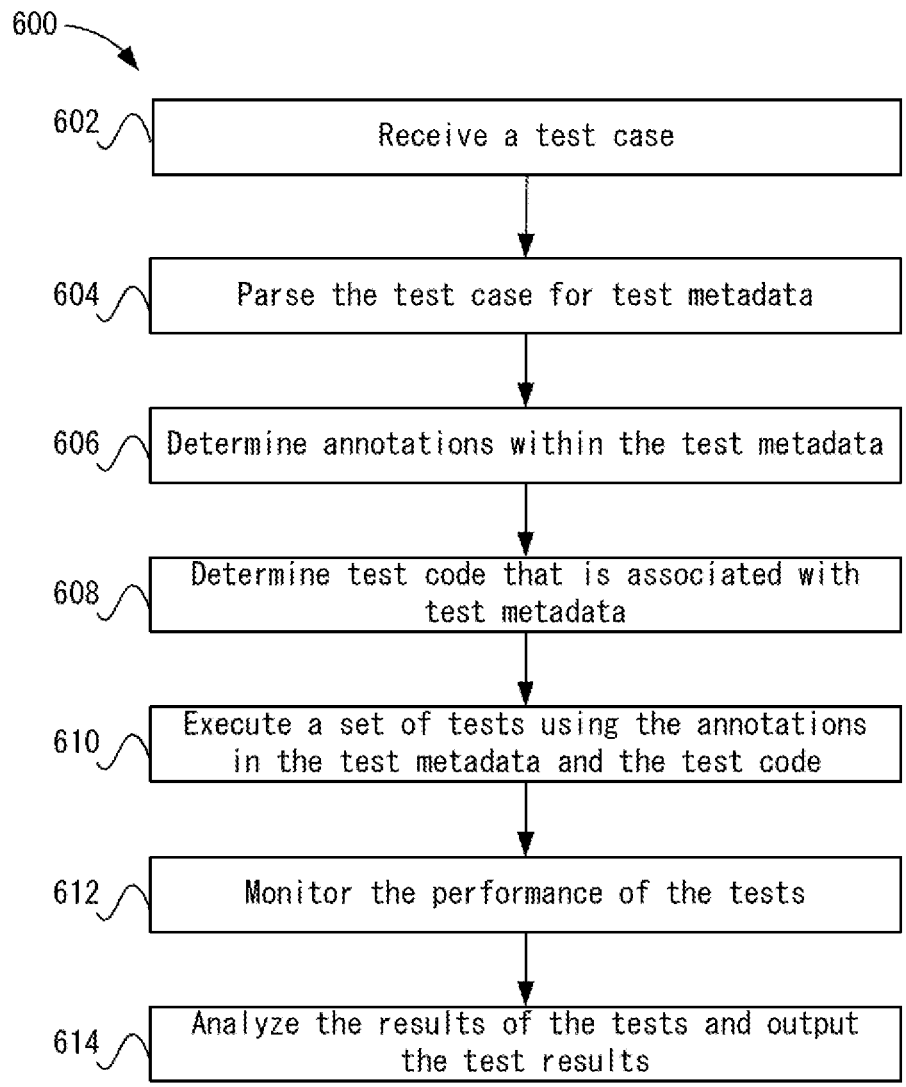
FIG. 6 depicts a simplified flowchart of a method for executing a test case 104 according to one embodiment.

FIG. 6 depicts a simplified flowchart 600 of a method for executing a test case 104 according to one embodiment. At 602, execution engine 108 receives test case 104. At 604, execution engine 108 parses test case 104 for test metadata 110. At 606, execution engine 108 determines annotations within test metadata 110. Then, at 608, execution engine 108 determines test code 112, which is associated with test metadata 110.

Depending on the annotations in test metadata 110, at 610, execution engine 108 executes a set of tests using the annotations in test metadata 110 and test code 112. At 612, execution engine 108 monitors the performance of the tests. Then, at 614, execution engine 108 analyzes the results of the tests and outputs test results.

Accordingly, a test case 104 may be annotated where multiple test types may be created using test metadata 110. The same test code 112 may be used to create multiple tests for different test types. This eliminates redundancy in creating multiple tests with the same test code. This may improve efficiency as only a single instance of test code 112 may need to be changed if the test code is changed. Also, the metadata can be changed to have different types of tests performed.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    determining a test case containing test code for testing a target computer system, the test case associated with metadata;
    parsing the metadata to determine a plurality of system test types and one or more parameters for the plurality of system test types, wherein the plurality of system test types correspond to testing at least functionality, load, performance, and stress of the target computer system, and the one or more parameters indicate system conditions for the target computer system, wherein parsing the metadata comprises determining a first system test type and determining a second system test type, wherein the second system test type is included within an annotation for the first system test type or the first system test type references the second system test type that is annotated separately in the metadata;
    executing a set of tests using the test code on the target computer system based on the plurality of system test types and the system conditions, wherein the set of tests test the first system test type and the second system test type together using the test code; and
    outputting results of the executed set of tests for the plurality of system test types.

2. The method of claim 1, wherein outputting the results comprises: determining which information to monitor for the executed set of tests based on the plurality of system test types; and determining the results using the determined information.

3. The method of claim 1, wherein outputting the results comprises: receiving a set of results for the set of tests; comparing the set of results and the one or more parameters; and determining the results based on the comparing.

4. The method of claim 1, wherein the set of tests that are executed are a plurality of tests that use the test code to test the plurality of system test types.

5. The method of claim 1, wherein executing the set of tests comprises: executing a first test using a first system condition specified in the one or more parameters; and executing a second test using a second system condition specified in the one or more parameters.

6. A non-transitory computer-readable storage medium containing instructions, that when executed, control a computer system to be configured for:
    determining a test case containing test code for testing a target computer system, the test case associated with metadata;
    parsing the metadata to determine a plurality of system test types and one or more parameters for the plurality of system test types, wherein the one or more parameters indicate system conditions for the target computer system, and the plurality of system test types correspond to testing at least functionality, load, performance and stress of the target computer system, wherein parsing the metadata comprises determining a first system test type and determining a second system test type, wherein the second system test type is included within an annotation for the first system test type or the first system test type references the second system test type that is annotated separately in the metadata;
    executing a set of tests using the test code on the target computer system using the system conditions, wherein the set of tests test the first system test type and the second system test type together using the test code; and
    outputting results of the executed set of tests for the plurality of system test types.

7. The non-transitory computer-readable storage medium of claim 6, wherein outputting the results comprises:
    determining which information to monitor for the executed set of tests based on the plurality of system test types; and determining the results using the determined information.

8. The non-transitory computer-readable storage medium of claim 6, wherein outputting the results comprises: receiving a set of results for the set of tests; comparing the set of results and the one or more parameters; and determining the results based on the comparing.

9. The non-transitory computer-readable storage medium of claim 6, wherein the set of tests that are executed are a plurality of tests that use the test code to test the plurality of system test types.

10. The non-transitory computer-readable storage medium of claim 6, wherein executing the set of tests comprises: executing a first test using a first system condition specified in the one or more parameters; and executing a second test using a second system condition specified in the one or more parameters.

11. An apparatus comprising:
    one or more computer processors; and
    a non-transitory computer-readable storage medium comprising instructions, that when executed, control the one or more computer processors to be configured for:
    determining a test case containing test code for testing a target computer system, the test case associated with metadata;
    parsing the metadata to determine a plurality of system test types and one or more parameters for the plurality of system test types, wherein the one or more parameters indicate system conditions for the target computer system, and the plurality of system test types correspond to testing at least functionality, load, performance, and stress of the target computer system, wherein parsing the metadata comprises determining a first system test type and determining a second system test type, wherein the second system test type is included within an annotation for the first system test type or the first system test type references the second system test type that is annotated separately in the metadata;
    executing a set of tests using the test code on the target computer system using the system conditions, wherein the set of tests test the first system test type and the second system test type together using the test code; and
    outputting results of the executed set of tests for the plurality of system test types.

12. The apparatus of claim 11, wherein outputting the results comprises:

determining which information to monitor for the executed set of tests based on the plurality of system test types; and determining the results using the determined information.

13. The apparatus of claim 11, wherein outputting the results comprises: receiving a set of results for the set of tests; comparing the set of results and the one or more parameters; and determining the results based on the comparing.

14. The apparatus of claim 11, wherein the set of tests that are executed are a plurality of tests that use the test code to test the plurality of system test types.

15. The apparatus of claim 11, wherein executing the set of tests comprises: executing a first test using a first system condition specified in the one or more parameters; and executing a second test using a second system condition specified in the one or more parameters.

* * * * *